(12) United States Patent
Panwar et al.

(10) Patent No.: US 8,175,003 B2
(45) Date of Patent: May 8, 2012

(54) COOPERATIVE WIRELESS COMMUNICATIONS

(75) Inventors: Shivendra S. Panwar, Freehold, NJ (US); Pei Liu, Brooklyn, NJ (US); Zhifeng Tao, Brooklyn, NY (US)

(73) Assignee: Polytechnic University, Brooklyn, NY (US)

( * ) Notice: Subject to any disclaimer, the term of this patent is extended or adjusted under 35 U.S.C. 154(b) by 467 days.

(21) Appl. No.: 11/937,823

(22) Filed: Nov. 9, 2007

(65) Prior Publication Data

US 2008/0285480 A1 Nov. 20, 2008

Related U.S. Application Data

(62) Division of application No. 11/246,030, filed on Oct. 7, 2005, now Pat. No. 7,330,457.

(60) Provisional application No. 60/724,145, filed on Oct. 6, 2005, provisional application No. 60/616,773, filed on Oct. 7, 2004.

(51) Int. Cl.
*H04L 12/28* (2006.01)

(52) U.S. Cl. ........ 370/253; 370/313; 370/314; 370/328; 370/329; 370/343

(58) Field of Classification Search ........................ None
See application file for complete search history.

(56) References Cited

U.S. PATENT DOCUMENTS

| | | | |
|---|---|---|---|
| 6,026,303 A * | 2/2000 | Minamisawa | 455/446 |
| 6,580,909 B1 | 6/2003 | Carro | 455/435.1 |
| 6,687,487 B1 | 2/2004 | Mosebrook et al. | 455/11.1 |
| 7,197,013 B2 * | 3/2007 | Douglas et al. | 370/252 |
| 7,768,927 B1 * | 8/2010 | Nucci et al. | 370/238 |
| 2003/0129978 A1 * | 7/2003 | Akiyama et al. | 455/426 |
| 2003/0204636 A1 * | 10/2003 | Greenblat et al. | 709/251 |
| 2004/0066759 A1 * | 4/2004 | Molteni et al. | 370/329 |
| 2004/0190447 A1 * | 9/2004 | Dacosta | 370/229 |
| 2004/0235489 A1 | 11/2004 | Kwon | 455/452.2 |
| 2005/0030930 A1 * | 2/2005 | Cho et al. | 370/338 |

OTHER PUBLICATIONS

Zhu et al., "On Improving the Performance of IEEE 802.11 with Relay-Enabled PCF," Mobile Networks and Applications, 2004, 9, 423-434.

Zhu et al., "rDCF: A Relay-enabled Medium Access Control Protocol for Wireless AD Hoc Networks," Department of Computer Science & Engineering, The Pennsylvania State University, downloaded 2008, 1-12.

* cited by examiner

*Primary Examiner* — Huy Vu
*Assistant Examiner* — Zewdu A Beyen
(74) *Attorney, Agent, or Firm* — Woodcock Washburn LLP

(57) ABSTRACT

When it is advantageous to do so, a wireless LAN station sends data packets to a destination station via an intermediate station, instead of to the destination station directly. That is, the intermediate station, which serves as a helper to the source, forwards packets received from the source station to the intended destination station. This cooperative data transmission approach can result in system performance improvement, as long as the total time consumed by two-hop transmission (i.e., transmission via the helper station) is less than direct transmission. Such a determination may be made using rate information stored at each station. Specifically, using the rate information, signaling needed to set up a transmission, the amount of data to be transmitted, etc., transmitting the data directly and via a help station may be compared.

23 Claims, 15 Drawing Sheets

| ID (48 BITS) | TIME (8 BITS) | $R_{hd}$ (8 BITS) | $R_{sh}$ (8 BITS) | NUMBER OF FAILURES |
|---|---|---|---|---|
| MAC ADDRESS OF HELPER 1 | TIME THE LAST PACKET HEARD FROM HELPER 1 | TRANSMISSION RATE BETWEEN HELPER 1 AND THE DESTINATION | TRANSMISSION RATE BETWEEN THE SOURCE AND THE HELPER 1 | COUNT OF SEQUENTIAL TRANSMISSION FAILURES |
| ......... | ............ | ............ | ............ | ............ |
| MAC ADDRESS OF HELPER N | TIME THE LAST PACKET HEARD FROM HELPER N | TRANSMISSION RATE BETWEEN HELPER N AND THE DESTINATION | TRANSMISSION RATE BETWEEN THE SOURCE AND THE HELPER N | COUNT OF SEQUENTIAL TRANSMISSION FAILURES |

COOPERATIVE WIRELESS COMMUNICATIONS

CROSS-REFERENCE TO RELATED APPLICATIONS

This application is a divisional of U.S. application Ser. No. 11/246,030, filed Oct. 7, 2005, now U.S. Pat. No. 7,330,457, which claims the benefit of U.S. Application No. 60/616,773, filed Oct. 7, 2004, and U.S. Application No. 60/724,145, filed Oct. 6, 2005, the disclosures of which are incorporated herein by reference.

1. BACKGROUND 1.1 Field of the Invention

The present invention concerns wireless communications. More specifically, the present invention concerns improving wireless communications, such as communications taking place in a wireless LAN.

1.2. Background Information

Recent advances in the areas of wireless communications, digital signal processing, and VLSI make it feasible to provide wireless networking with high capacity and coverage at reasonably low cost. In the past few years, various wireless networking standards (e.g., IEEE 802.11, IEEE 802.15, etc.) have been ratified and corresponding products deployed in the field. Medium access control protocols for these standards control access to the transmission medium and provide for an orderly and efficient use of that capacity. A popular wireless protocol—IEEE 802.11—is introduced below.

1.2.1 IEEE 802.11 Medium Access Control (MAC) Protocol

IEEE 802.11 was the first international standard for indoor wireless local-area networks (WLAN). It provides physical layer rates of 1 and 2 Mbps. IEEE 802.11b was introduced later in 1999. It uses three (3) different modulation schemes (i.e., Differential Binary Phase Shift Keying (DBPSK), Differential Quaternary Phase Shift Keying (DQPSK), and Complementary Code Keying (CCK)) which provide a total of four different physical layer rates, ranging from 1 to 11 Mbps.

The basic MAC protocol of IEEE 802.11b is the distributed coordination function (DCF) which employs carrier sense multiple access with collision avoidance (CSMA/CA). It is contention-based and uses both physical carrier sensing and virtual carrier sensing to avoid collisions. When a station (STA) has data to send, it first senses the media to check if other STAs are transmitting. (Note that the use of "station" in this application is not intended to imply that a node or terminal is stationary. Thus, "station" may include any type of node, including mobile devices.) If other STAs are not transmitting, a request to send (RTS) packet is sent and the intended receiver will reply with a clear to send (CTS) packet. These two control packets are used to set a network allocation vector (NAV), in which the channel reservation information is stored, for all the stations to avoid the hidden terminal problem.

After successfully exchanging the control packets, a data packet will be sent and the destination station will send back an acknowledgment (ACK) if the packet has been received without error.

IEEE 802.11 MAC protocol supports multirate capability. Each station can select an appropriate rate to transmit the data, based upon the perceived ambient channel condition. The rate selection/adaptation algorithm is left as implementation dependent in the IEEE 802.11 standard. However, all rate adaptation algorithms follow a common principle outlined in the '773 provisional and described below.

Assume all stations are equipped with a single transmitting and receiving antenna. The available bandwidth is W Hz (11 MHz for 802.11b). Transmission power for each station is $P_0$ Watts. If the distance between the transmitter and receiver is d meters, the received signal power would be:

$$P = P_0 d^{-\eta} \qquad \text{Equation 1}$$

where $\eta$ is the path loss exponent (PLE) and usually varies between 2 and 4.

The received signal is also subject to fading due to the multipath effect. In a typical indoor environment, where there is no line-of-sight transmission, the Rayleigh fading model is an appropriate model. Its probability density function (pdf) is given by:

$$p(r) = \frac{r}{\sigma^2} \exp\left(-\frac{r}{2\sigma^2}\right) \qquad \text{Equation 2}$$

where $\sigma^2$ is the time-average power of the received signal before envelope detection and r is the distance between the transmitter and receiver.

In the IEEE 802.11b, the Direct Sequence Spread Spectrum (DSSS) physical layer operates in the 2.4 GHz ISM band, and three different modulation schemes are used. They are: Differential Binary Phase Shift Keying (DBPSK) for the 1 Mbps data rate, Differential Quaternary Phase Shift Keying (DQPSK) for the 2 Mbps data rate, and Complementary Code Keying (CCK) for the 5.5 Mbps and 11 Mbps data rates, respectively. The control packets and header part of the data packets are always modulated using DBPSK. The modulation scheme of the data frame is indicated in the physical layer header of the data packet.

For DBPSK modulation the bit error probability in the AWGN channel is:

$$p_e = \frac{1}{2}\exp\left(-\frac{E_b}{N_0}\right) \qquad \text{Equation 3}$$

where $E_b$ is the per bit energy of the transmitted signal and $N_0$ is the power spectral density of the additive white Gaussian noise.

For DQPSK modulation, the error probability is $$p_e = Q_1(a, b) - \frac{1}{2}I_0(a, b)\exp\left(-\frac{1}{2}(a^2 + b^2)\right) \qquad \text{Equation 4}$$

where $Q_1(a,b)$ is the Marcum Q function and $I_0(a,b)$ is the modified zero order Bessel function. a and b are defined as:

$$\begin{cases} a = \sqrt{\frac{2E_b}{N_0}\left(1 - \sqrt{\frac{1}{2}}\right)} \\ b = \sqrt{\frac{2E_b}{N_0}\left(1 + \sqrt{\frac{1}{2}}\right)} \end{cases} \qquad \text{Equation 5}$$

For DBPSK modulation the system processing gain is 11 and 5.5 for DQPSK modulation. The 5.5 and 11 Mbps data rate use CCK as the modulation scheme and their processing gain is 2 and 1 respectively. The bit error probability is:

$$P_e = 1 - \int_{-X}^{\infty} \left( \frac{1}{\sqrt{2\pi}} \int_{-v+X}^{v+X} \exp\left(-\frac{y^2}{2}\right) dy \right)^{\frac{M}{2}-1} \exp\left(-\frac{v^2}{2}\right) dv \qquad \text{Equation 6}$$

Where $$X = \sqrt{\frac{E_b}{N_0}} \qquad \text{Equation 7}$$

The performance curves of bit error rate (BER) versus signal-to-noise ratio (SNR) for different modulation scheme are shown in FIG. 1 of the '773 provisional. Using the above bit error probability and assume independent random error for each bit, the packet error rate (PER) for a L-octet data packet can be calculated as:

$$P = 1-(1-P_e)^{8L} \qquad \text{Equation 8}$$

If the quality-of-service parameters (bit error rate (BER), packet error rate (PER), etc.) are given, the most suitable modulation scheme and the corresponding transmission rate can always be found based on the distance between the transmitter and receiver using the equations given above. In a real implementation, each station may estimate the ambient channel condition by measuring the received signal power strength and then determine which transmission rate can yield the best BER/SNR performance.

Various amendments (e.g., IEEE 802.11e, IEEE 802.11g, etc) to IEEE 802.11 have been released to improve or enhance a certain aspect of the legacy standard. Nevertheless, no change has been made, with respect to the direct data transmission approach from the transmitter to the receiver.

1.2.1.1 Perceived Limitations of the Current IEEE 802.11

Since the MAC scheme is contention-based and the transmission rate of different stations can vary widely (e.g., from 1 to 11 Mbps in IEEE 802.11b), if all the stations have uniform traffic to/from the access point (AP), the low data rate stations will use much more channel time than the high data rate stations. This results in a significant degradation of network throughput as well as average delay perceived by all transmitting stations.

Moreover, this MAC scheme suffers from serious fairness problems. More specifically, the high rate stations have the same channel access probability as the low rate stations, but in fact they obtain a lower share of channel occupation time than the low rate stations.

In view of the foregoing limitations of the current IEEE 802.11 protocol, a new MAC protocol that can achieve better performance and provide fair service would be useful. It would also be useful if such an approach could also reduce interference and improve coverage in an area covered by multiple access points. It would be useful if such an approach were backwards compatible with current IEEE 802.11 standards. It would be useful if such an approach could be used with other wireless techniques and protocols.

2. SUMMARY OF THE INVENTION

Embodiments consistent with the present invention enable wireless LAN stations to transmit a data packet first to an intermediate station, and then to the destination station, if this two-hop transmission approach is faster than direct transmission.

In at least some embodiments consistent with the present invention, stations may maintain data rate information between it and various stations in a local area network. Such data rate information may be used in determining whether communication with a destination station via in intermediate (helper) terminal is faster than direct communication with the destination station.

At least some embodiments consistent with the present invention may apply such a technique as a new MAC protocol applied to an IEEE 802.11 network.

3. BRIEF DESCRIPTION OF THE DRAWINGS

FIG. 2 illustrates an exemplary table data structure, consistent with the present invention, for storing information about potential helper stations and that may be maintained by each station, in a manner consistent with the present invention.

4. DETAILED DESCRIPTION

Figure 1:
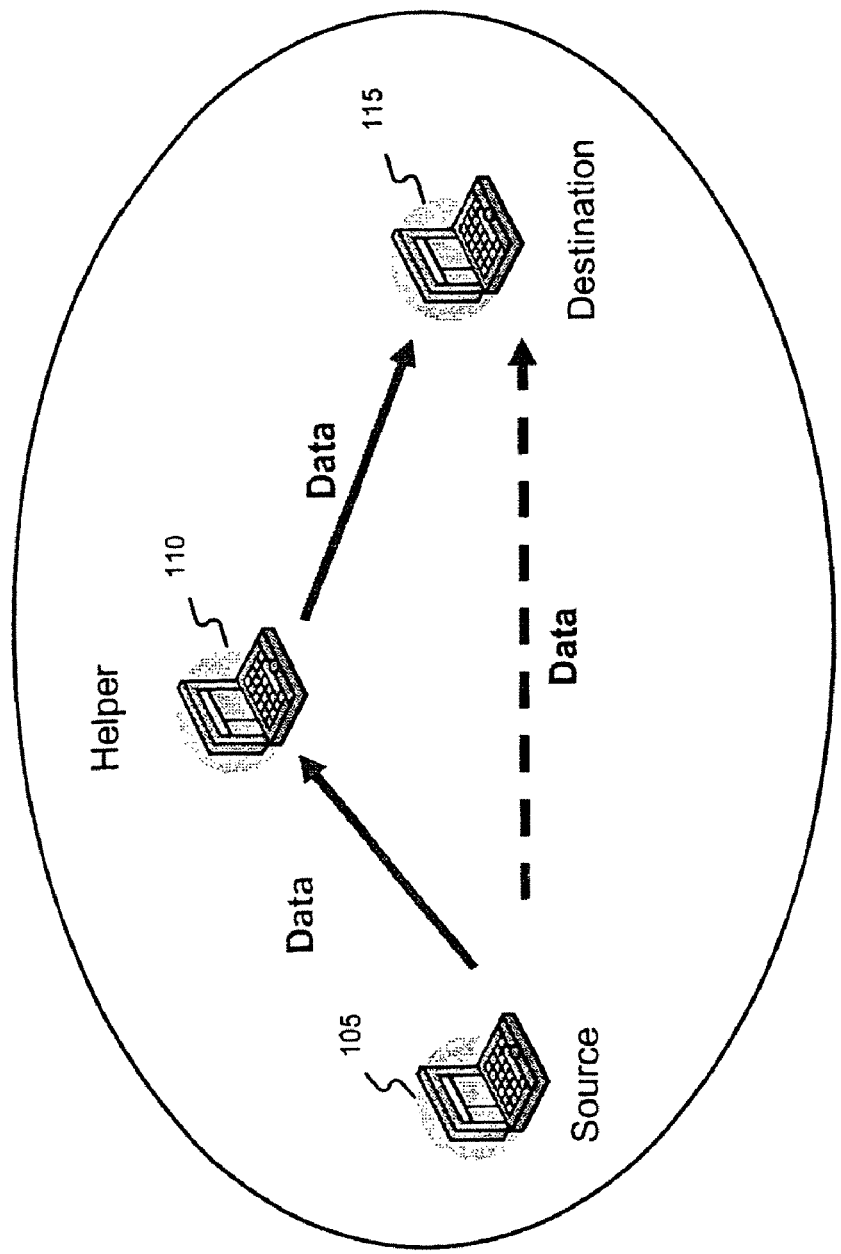
FIG. 1 illustrates transmission paths between a source station, a helper station and a destination station.

The present invention may involve novel methods, apparatus, message formats, and/or data structures for improving communications in a wireless network. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. Also, as used herein, the article "a" is intended to include one or more items. Where only one item is intended, the term "one" or similar language is used. In the following, "information" may refer to the actual information, or a pointer to, identifier of, or location of such information. No element, act or instruction used in the description should be construed as critical or essential to the present invention unless explicitly described as such. Thus, the present invention is not intended to be limited to the embodiments shown and the inventors regard their invention to include any patentable subject matter described.

4.1 OVERVIEW

The following exemplary embodiments are described in the context of a wireless network employing the MAC protocol. However, the present invention is not limited to such embodiments. That is, even though the focus of these two new MAC protocols are on the IEEE 802.11 wireless LAN, the general principle of cooperative medium access control protocol can also be extended to other types of wireless networks such as wireless personal area networks (WPAN).

Generally, for a cooperative MAC protocol consistent with the present invention, when it is advantageous to do so, each station sends the data packets to a destination station via an intermediate station, instead of to the destination station directly. That is, the intermediate station, which serves as a helper to the source, forwards packets received from the source station to the intended destination station. This cooperative data transmission approach can result in system performance improvement, as long as the total time consumed by two-hop transmission (i.e., transmission via the helper station) is less than direct transmission. Such a determination may be made using rate information stored at each station. Specifically, using the rate information, signaling needed to set up a transmission, the amount of data to be transmitted, etc., transmitting the data directly and via a help station may be compared.

FIG. 1 illustrates transmission paths between a source station 105, a helper station 110 and a destination station 115. In particular, it illustrates a transmission via a helper station 110 versus a direct transmission from source 105 to destination 115. In FIG. 1, the dashed arrow represents the legacy direct data transmission path, while the solid lines show cooperative data forwarding at the medium access control (MAC) layer done in a manner consistent with the present invention.

Two exemplary MAC protocols for a wireless local area network (WLAN) using the cooperative approach are described below in sections 4.3 and 4.4, respectively. First, however, information that may be stored and maintained at the stations, and used by the exemplary MAC protocols, are described in §4.2. The proposed solutions are valid, regardless of the type of channel access method, the network operation mode, or the type of amendment to IEEE 802.11. They apply to the data transmission occurring during both the contention period (e.g., DCF, EDCA, etc) and contention free period (e.g., PCF, HCCA, etc), and for both the infrastructure and ad hoc modes.

For the following two MAC protocols, several reasonable assumptions have been made. First, it has been assumed that the transmission power for all the stations is fixed. Second, it is assumed that RTS and CTS packets can be overheard by other stations besides the transmitter and the intended receiver. Third, it is assumed that transmitting stations choose the best modulation scheme based on the received signal-to-noise ratio (SNR). The threshold SNR for each modulation type are called physical mode. Finally, it is assumed that uplink (from mobile stations to AP) and downlink (from AP to mobile stations) traffic use the same frequency and hence the channels are symmetric.

4.2 EXEMPLARY INFORMATION AND DATA STRUCTURE

In accordance with IEEE 802.11, a station listens to the channel for RTS, CTS, data packets and ACKs sent out by other stations, once it is associated with the AP in the basic service set BSS. This allows the station to correctly set the NAV value and avoid the hidden node problem. In the proposed MAC protocols, a station that is considered by the source as a qualified node that can help relay the traffic is denoted by "helper" in the following description. For the proposed two MAC protocols, a table is maintained by each station locally. This table, which is called the "CoopTable", stores the information about potential helpers.

FIG. 2 illustrates an exemplary table 200 for storing information about potential helpers in a manner consistent with the present invention. The table 200 may be maintained at each station. That is, each station in a basic service set (BSS) should maintain a table, referred to as the "CoopTable", of potential helpers that can be used for assistance during transmission. Note that in infrastructure mode, the AP maintains one CoopTable for each possible destination address, while mobile stations only need to keep one such table for the AP with which they are associated. The creation and update of the CoopTable can be done by passively listening to all ongoing transmissions. This is facilitated by the fact that each station in an 802.11 network is required to check the packet header of all the packets it receives in order to pick up the packets intended for it. The stations also need to decode entire Request-To-Send (RTS), Clear-To-Send (CTS) and acknowledgment (ACK) frames to get the channel reservation information to avoid the hidden node problem. The control frames and headers of data frames are always modulated at the base rate (1 Mbps for 802.11b and 6 Mbps for 802.11a and 802.11g), so that all stations within the transmission range will be able to receive this information successfully. The mechanism by which a station (denoted by $S_s$) learns about a potential helper station is described below.

When any transmission from another station (denoted by $S_h$) is heard, the source station $S_s$ estimates the channel condition (e.g. path loss) between the sender of that packet and it by measuring the received power strength. Since all stations use the same frequency band for transmission and reception, the channel between any two stations may be assumed to be symmetric. Path loss can be calculated by subtracting the transmission power (in dB), which is typically fixed for all stations, from the received signal power (in dB). The availability of such information is supported by the IEEE 802.11k protocol. By checking the threshold value, which is pre-calculated and guarantees a certain QoS for each modulation scheme, the data rate between $S_h$ and $S_s$, denoted by $R_{sh}$, may be determined. When station $S_s$ overhears a data packet transmission between a pair of other stations (from $S_h$ to $S_d$), it may identify the data rate used for this transmission from the Physical Layer Convergence Procedure (PLCP) header. This rate will be referred to as $R_{hd}$.

Referring back to FIG. 2, the CoopTable 200 may include a number of entries (rows), and each entry may include a number of fields. The first column of the table 200, namely the ID field 205, stores an identifier (e.g., the MAC address) of the potential helpers learned from the RTS frames transmitted by the helper. The Time field 210 stores the time of the last frame transmission heard from this helper. As described above, $R_{hd}$ 215 and $R_{sh}$ 220 store the data rate from the helper station to the destination $S_d$, and from the source $S_s$ to the helper station, respectively. The last field in the table, "Number of Failures" 225, tracks the number of sequential failures associated with the particular helper station. When this number exceeds a predefined threshold value (e.g., 3), the corresponding entry may be removed from the CoopTable 200. The value of "Number of Failures" 225 may be incremented after every failed transmission attempt through the helper station and this value may be reset to zero after a successful transmission through the particular helper station. Each of these entries is updated to reflect the current channel conditions and status. CoopTable entries can also be populated using information gained from cooperative transmissions received by a station.

In at least some embodiments consistent with the present invention, the entries may be ordered by the timestamp values 210, based on the last time a packet from the identified station 205 is overheard.

In at least some embodiments consistent with the present invention, information pertaining to a helper station may be stored in the CoopTable 200 by $S_s$ if it satisfies:

$$\frac{1}{R_{sh}} + \frac{1}{R_{hd}} > \frac{1}{R_{sd}}$$

where $R_{sd}$ is the rate for direct transmission between $S_s$ and $S_d$.

In at least some embodiments consistent with the present invention, entries with lower values for "Number of Failures" 225 are preferred during transmission.

Naturally, embodiments consistent with the present invention may store more or less information, or may store similar information in a different form from that shown.

Figure 3:
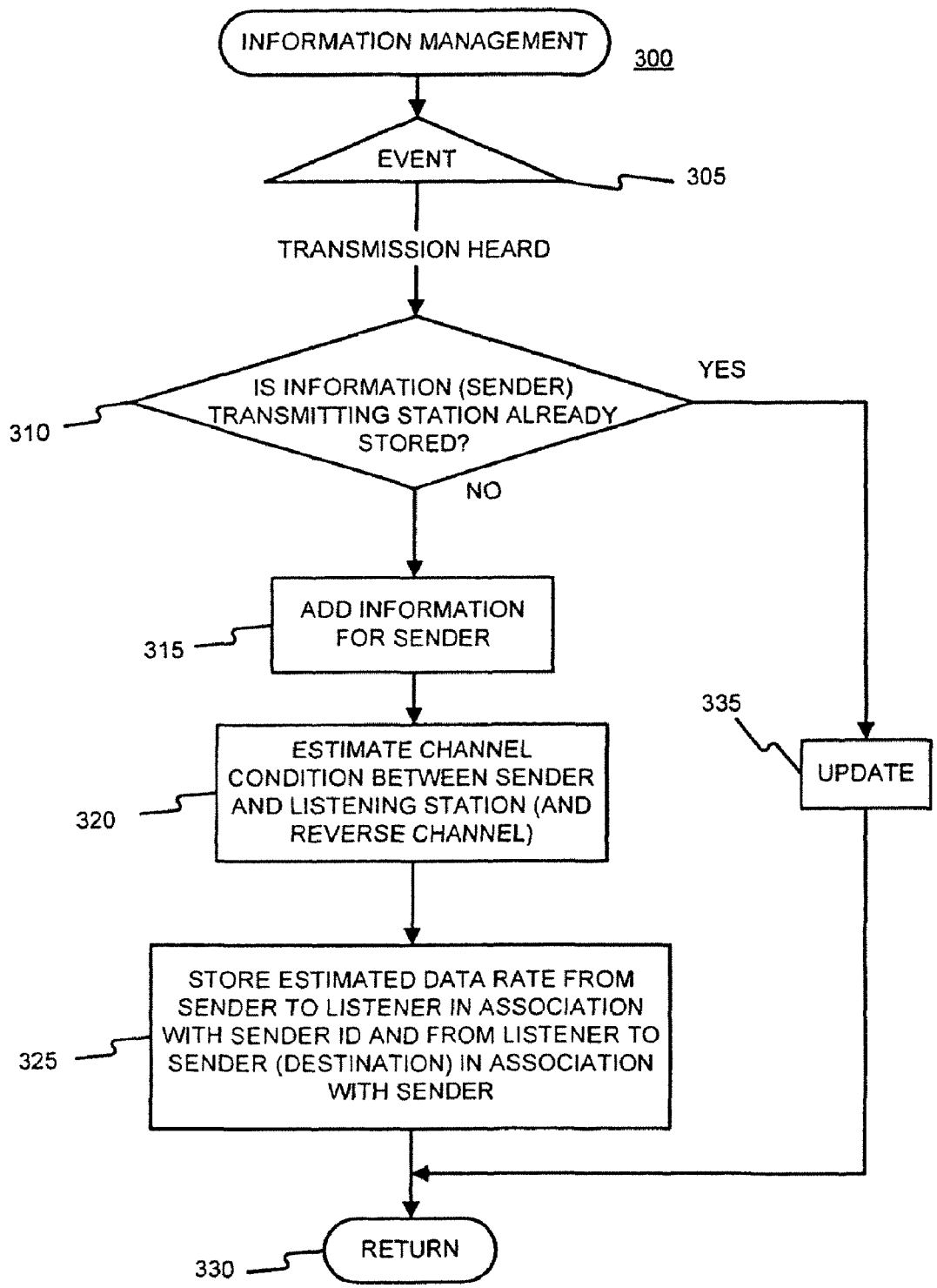
FIG. 3 is a flow diagram illustrating an exemplary method for entering and updating information about potential helper stations in a manner consistent with the present invention.

FIG. 3 is a flow diagram illustrating an exemplary method 300 that may be used to entering and updating information about potential helpers of a station (e.g., information of the CoopTable 200 of FIG. 2.) in a manner consistent with the present invention. When any transmission between other stations is heard by a given station, the station checks if the transmitting station is already stored (e.g., in the CoopTable 200). (Blocks 305 and 310) If the transmitting station is already stored, then the method 300 may simply update its information (e.g., time field 210) if necessary. (Block 335) If information pertaining to the transmitting station is not stored, then the method 300 may add information about the new sender (potential helper). (Block 315) For example, a new entry (row) may be added to the CoopTable 200 for the sender (potential helper), which can be uniquely identified by its MAC address stored in the ID field 205 (FIG. 2). The method 300 (station) estimates the relative channel condition (e.g. path loss) between the sender of that packet (potential helper) and itself. This may be done by measuring the received power level (in dB). Path loss can be calculated by subtracting the transmission power (in dB), which is fixed for all stations, and the received power. The availability of such information is guaranteed by the IEEE 802.11k protocol. Since the channel is assumed to be symmetric, the reverse channel is assumed to have the same performance. (Block 320) By checking the physical mode table, the data rate between this pair of nodes can be determined. This data rate is then used to create and/or update rate information (e.g., the $R_{sh}$ field 220). If any data packet between the AP and another node is overheard, the station will can detect the transmission rate used because the physical header of the control messages are transmitted at the base rate (e.g., 1 Mbps for IEEE 802.11b). This value is used to create and/or update rate information (e.g., the $R_{hd}$ field 215). The time field may be updated each time a packet is heard. (Block 325) Although not shown, stale entries and/or entries with too may transmission failures may be removed.

Having described information that may be stored and maintained at each station in a manner consistent with the present invention, and that may be used by embodiments consistent with the present invention, the two exemplary embodiments consistent with the present invention are described in §§4.3 and 4.4 below.

4.3 FIRST EMBODIMENT OF A MAC PROTOCOL CONSISTENT WITH THE PRESENT INVENTION

When a station S obtains the right to access the channel and has L octets of data (including the MAC header) to send to station D, it first checks the CoopTable 200 and calculates the time needed to transmit via each potential helper. The helper with the minimum transmission time for the packet is identified. If more than one potential helper has been found, the one with the latest time field (210) is used. This selected helper is denoted by H. Since the transmission may be in two steps, first from the source to the potential helper and then from the potential helper to the destination, the transmission time $T_{coop\text{-}data}$ can be written as:

$$T_{coop\text{-}data} = 3HDR_{PHY} + 8L/R_{sh} + 8L/R_{hd} + 8ACK/R_{sd} + 2SIFS \quad \text{Equation 9}$$

Where $HDR_{PHY}$ is the time to transmit the PHY header. Note that the propagation delay is neglected in the analysis hereafter. The associated signaling overhead is $T_{coop\text{-}sig}$:

$$T_{coop\text{-}sig} = 3HDR_{PHY} + 8RTS/R_b + 8HTS/R_b + 8CTS/R_b + 3SIFS \quad \text{Equation 10}$$

The RTS, HTS and CTS designate length of the RTS, HTS and CTS message. The usage of HTS message and the meaning of Equation 10 will be explained in the following protocol description. Therefore, the total time for transmitting a data packet in a cooperative manner is $$T_{coop} = T_{coop\text{-}data} + T_{coop\text{-}sig} \quad \text{Equation 11}$$

If the direct transmission rate is $R_{direct}$ between S and D, the time needed for direct data transmission is:

$$T_{direct\text{-}data} = HDR_{PHY} + 8L/R_{sd} + 8ACK/R_{sd} + SIFS \quad \text{Equation 12}$$

The associated RTS/CTS handshake takes $T_{direct\text{-}sig}$ time:

$$T_{direct\text{-}sig} = 2HDR_{PHY} + 8RTS/R_b + 8CTS/R_b + 2SIFS \quad \text{Equation 13}$$

The total time for transmitting a data packet in the legacy IEEE 802.11 protocol is:

$$T_{direct} = T_{direct\text{-}data} + T_{direct\text{-}sig} \quad \text{Equation 14}$$

So, when the condition shown in Equation 15 is met, two-hop transmission via the helper is more efficient (faster, and therefore uses the channel for a shorter period of time):

$$T_{legacy} > T_{coop} \qquad \text{Equation 15}$$

Otherwise, the packet may be delivered directly, following the rules specified in the IEEE 802.11 standard.

Figure 4:
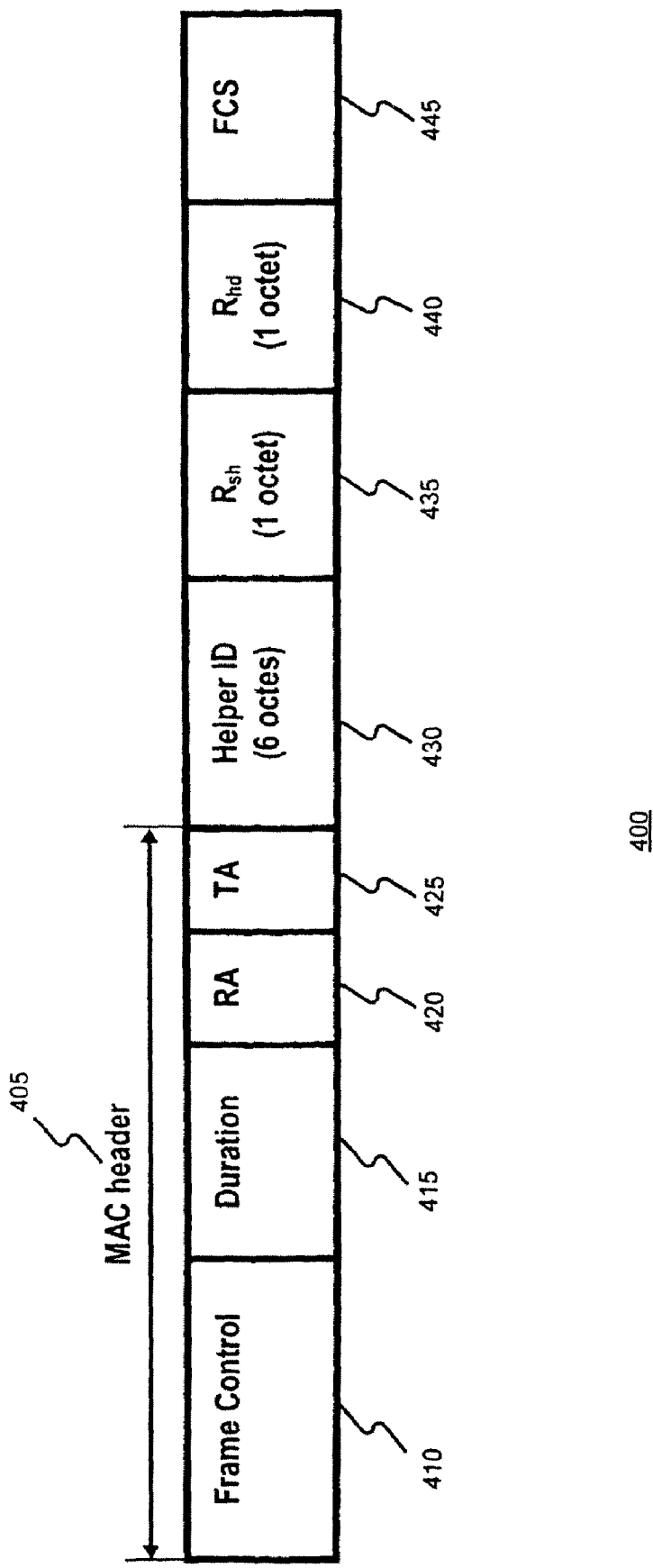
FIG. 4 illustrates an exemplary message format, consistent with the present invention, which may be sent by a source station to a destination station when the source station decides to use a cooperative communication approach consistent with the present invention.
Figure 5:
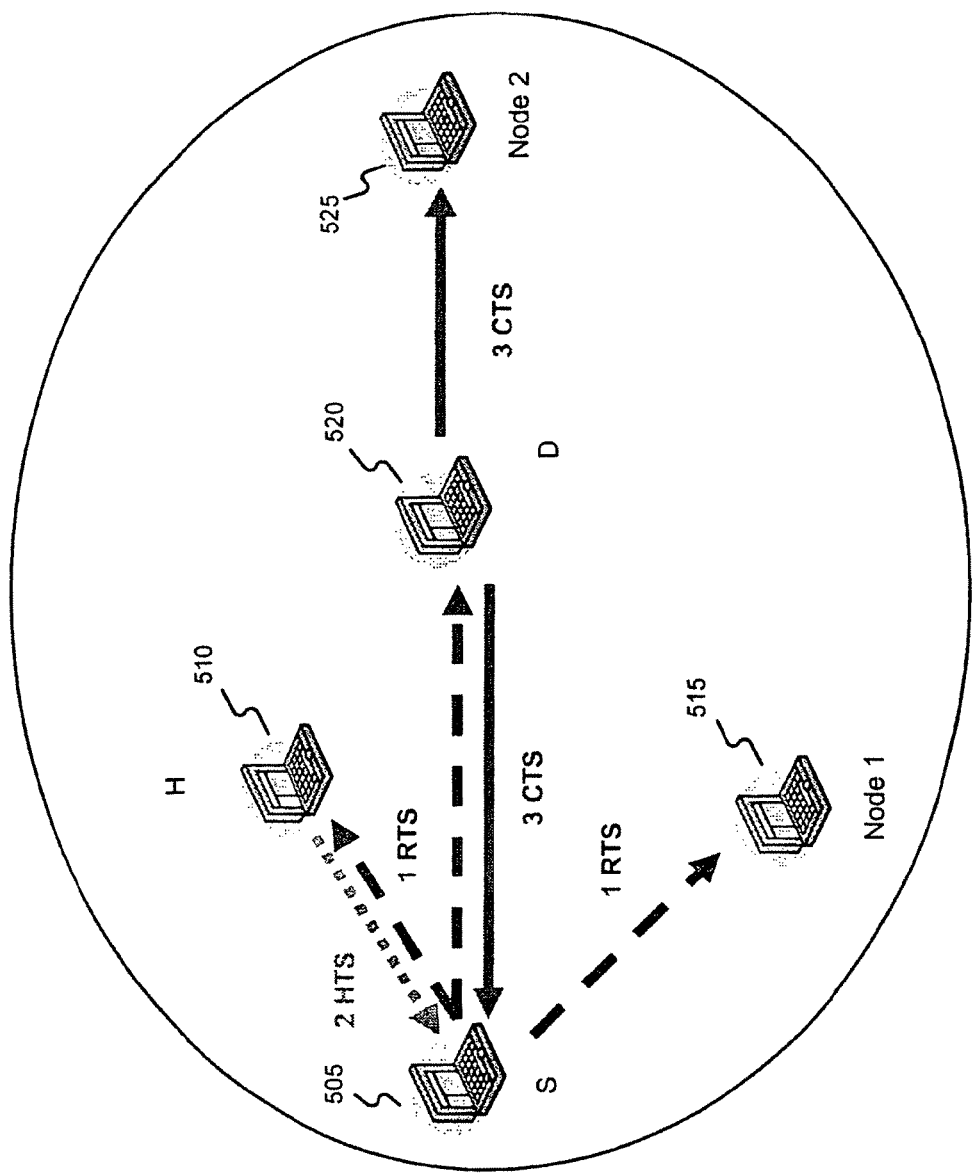
FIG. 5 illustrates a handshake procedure between source, helper, and destination stations in accordance with a cooperative MAC approach consistent with the present invention, as well as two "overhearing" nodes.

Referring to both FIGS. 4 and 5, once S 505 decides to use the cooperative approach and the helper H 510 is selected, S 505 sends a RTS frame to D 520, reserving the channel for a NAV duration for the data transmission. The new format of the RTS message 400 is shown in FIG. 4. The duration field 415 in the MAC header 405 of RTS frame 400 reserves the channel for the time needed for direct transmission. Three (3) new fields are introduced into the RTS message. The first field, helper ID 430, indicates the MAC address of the helper H selected. The other two fields, $R_{sh}$ 435 and $R_{hd}$ 440 store the supported transmission rate from the source to helper, and from helper to destination, respectively. Any station that receives this RTS message should update its NAV value as described herein.

After H 510 successfully decodes the RTS packet, if it can sustain both $R_{sh}$ and $R_{hd}$, a helper-to-send (HTS) message may be sent to the S 505 a SIFS time after the RTS is received. The format of HTS packet is the same as CTS packet. This packet is heard both by S 505 and D 520. If the helper 510 cannot sustain the rate or the RTS packet is corrupted, the helper 510 just stays idle.

D 520 will be expecting the HTS packet after receiving the RTS packet. If the HTS packet is received, the CTS packet is sent and reserves the channel for the time needed for two hop transmission via H 510. If HTS is not heard after two SIFS period, D 520 also sends the CTS packet. However, in this case, it reserves the channel for the time needed for direct transmission.

Figure 6:
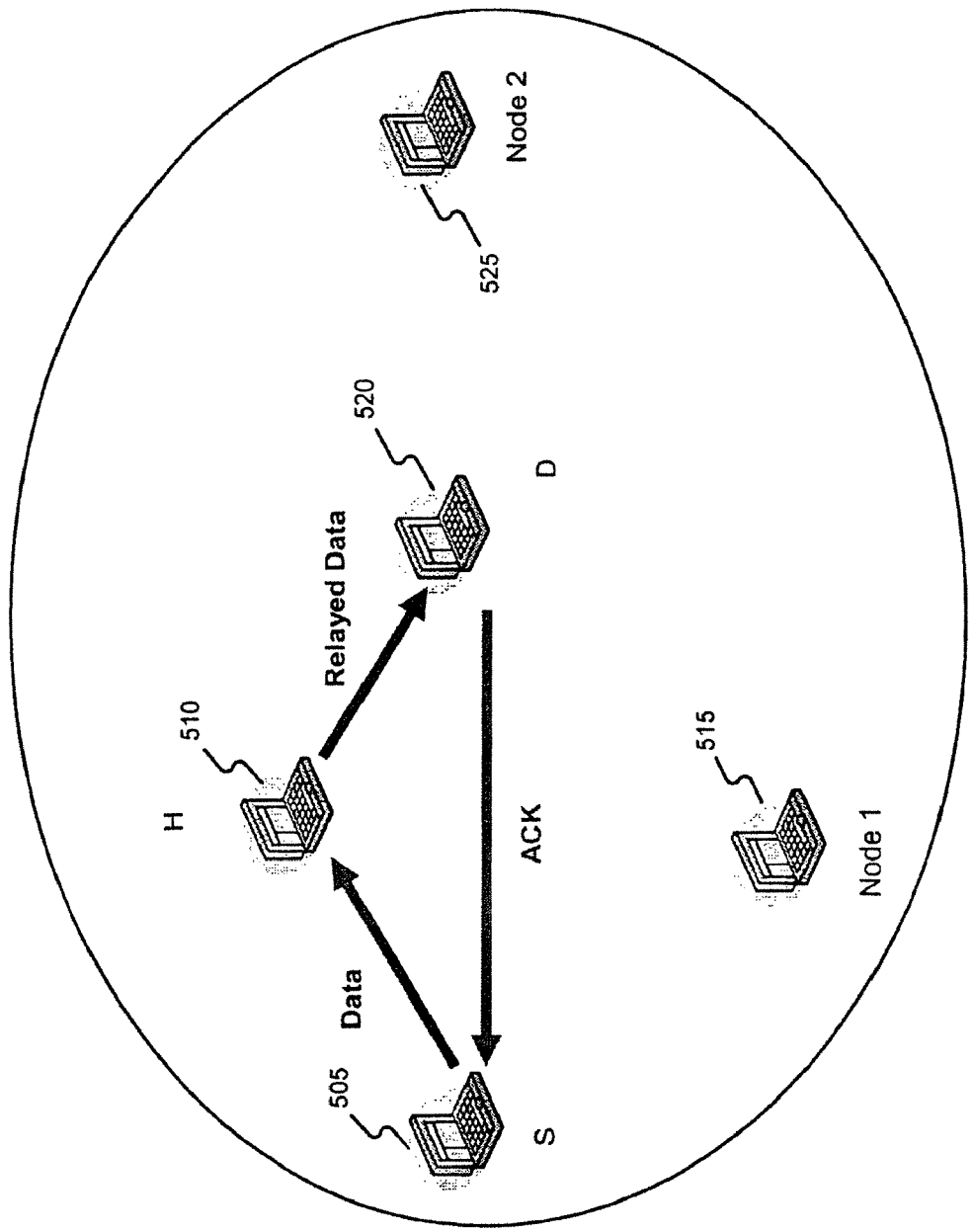
FIG. 6 illustrates the transmission of data and the associated acknowledgement packet between the source station, helper station, and destination station in a manner consistent with the present invention.

Referring to FIGS. 5 and 6, note that node 1 515 is in a place that both the RTS and CTS packets can be overheard, but node 2 525 can only hear the CTS packet. Thus, node 2 525 is a "hidden terminal" (i.e. a terminal which can not hear the ongoing transmission, but within the receiving range of the receiver). Once S 505 receives the CTS packet from D 520, it starts transmission of the data packet. If the HTS packet has been received, S 505 sends the data packet to H 510 using rate $R_{sh}$. H 510 checks the FCS field of the captured data packet and forwards the packet to D 520, if it is not corrupted, using rate $R_{hd}$ after a SIFS time.

Note that it is also possible that S 505 has not received the HTS packet before the CTS packet is received. This might be because the channel conditions have changed due to mobility. In such a case, S 505 may delete the entry for H 510 from the CoopTable and transmit the data packet directly to D 520, using rate $R_{sd}$.

After D 520 receives the data packet, it sends an ACK packet. Otherwise D 520 stays idle. In the latter case, S 505 will notice the failure of transmission after a timeout period and may then follow the appropriate retransmission rules specified in the IEEE 802.11 standard. In the former case (after a successful transmission is finished via H 510), S 505 may update the corresponding time field 210 in its CoopTable 200.

NAV Mechanism for First Embodiment

Figure 7:
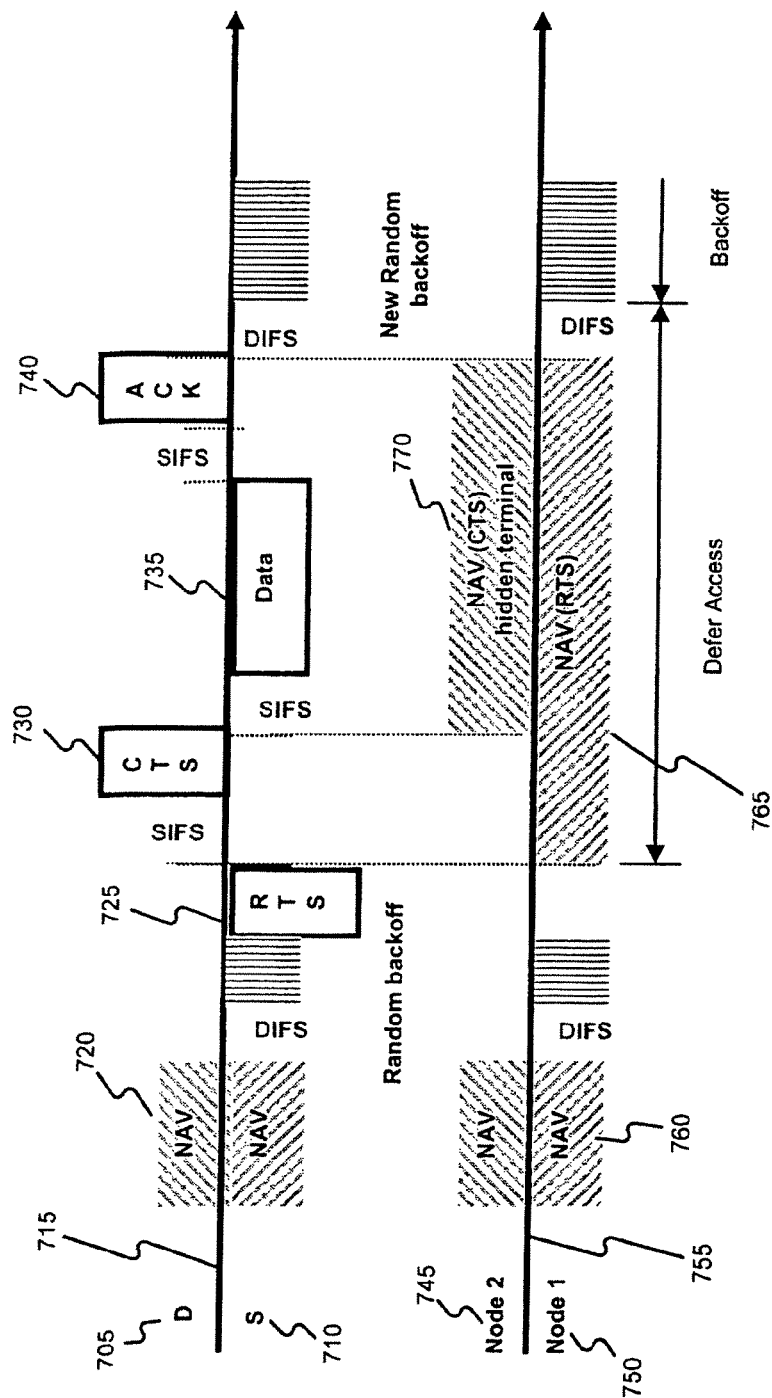
FIG. 7 illustrates a navigation allocation vector (NAV) mechanism defined in IEEE 802.11.

The original RTS and CTS frame formats defined in IEEE 802.11b have a duration field. This field in RTS contains the time value, in microseconds, required to transmit the pending frame, plus one CTS frame, one ACK frame, three SIFS intervals, while that in CTS has a time value equal to the duration value in corresponding RTS less one CTS time and one SIFS interval. This is depicted in FIG. 7. According to the legacy IEEE 802.11, the NAV at each station should be set to the value of the duration field in the received frame.

Figure 8:
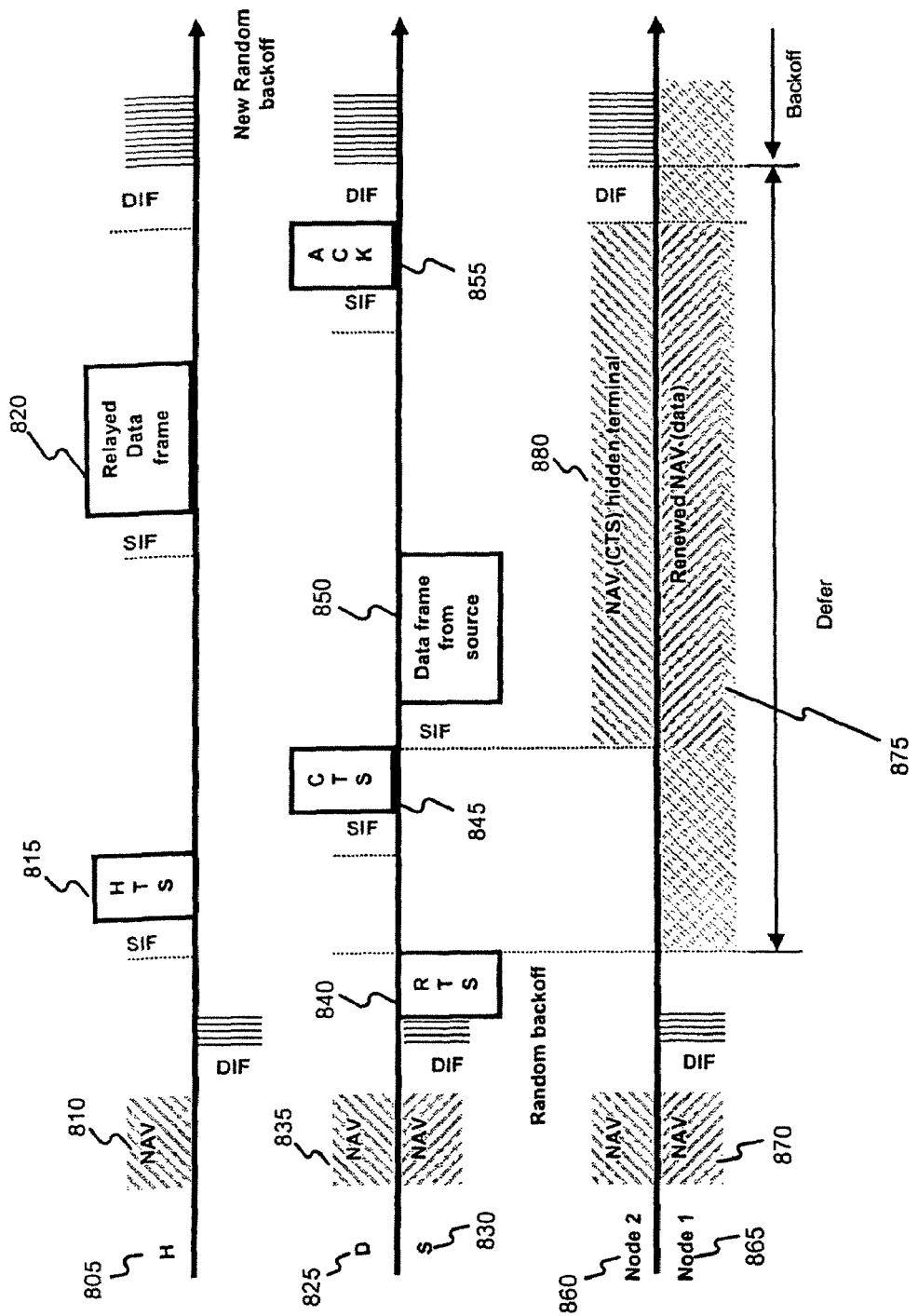
FIG. 8 illustrates another NAV mechanism for use with a cooperative MAC approach consistent with the present invention, when a helper station relays packets.
Figure 9:
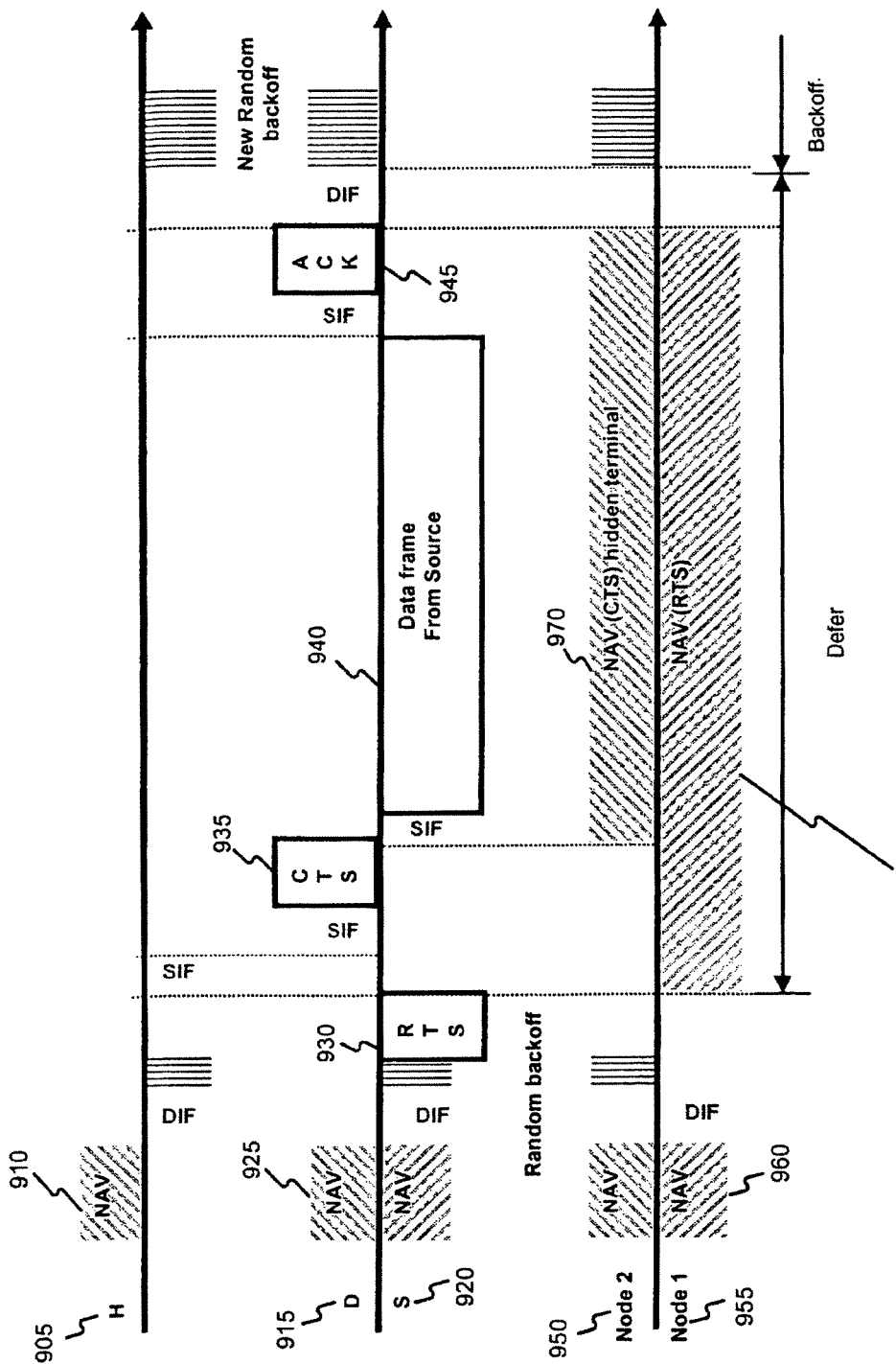
FIG. 9 illustrates another NAV mechanism for use with a cooperative MAC approach consistent with the present invention, when a helper station cannot help relays packets.

However, in some embodiments consistent with the present invention, the NAV may be configured differently, as illustrated in FIGS. 8 and 9. The duration carried in RTS should be, the time in microseconds required to transmit the pending data frame through direct transmission from S to D, plus one CTS frame, one ACK frame and three SIFS intervals.

$$T_{direct} - HDR_{PHY} - 8RTS/R_b \qquad \text{Equation 16}$$

This guarantees that even if the helper is not present, the packet can be sent through the network by direct transmission. The corresponding duration field in HTS may be set according to the following equation:

$$T_{coop} - 2HDR_{PHY} - 8RTS/R_b - 8HTS/R_b - SIFS \qquad \text{Equation 17}$$

To set the duration in the CTS, whether the HTS packet has been received is check. If so, faster transmission via the H is possible and the value of duration is:

$$T_{coop} - 3HDR_{PHY} - 8RTS/R_b - 8HTS/R_b - 8CTS/R_b - 2SIFS \qquad \text{Equation 18}$$

If HTS is not present, the duration in the CTS should equal to that stored in the corresponding RTS frame, less one CTS and one SIFS internal, as defined below:

$$T_{direct} - 2HDR_{PHY} - 8RTS/R_b - 8CTS/R_b - SIFS \qquad \text{Equation 19}$$

For those stations who can receive both the RTS and CTS frames (e.g. $T_1$), they set their NAV according to the duration in the RTS packet first. Once the HTS or CTS packet is captured, they might need to reset the NAV according to this new message. The duration fields in the new packets may reserve less time if the helper can forward packet from the source station. The NAVs at those stations should end right after the ACK packet. The hidden terminals (e.g. node 2) can only set their NAV by the duration field in the CTS, which is always accurate.

If the data packet is actually successfully delivered to D, every station may then proceeds to start a new cycle. On the other hand, if the data packet is lost, S may start a standard retransmission according to the IEEE 802.11 standard, since it has not received the ACK packet from the destination station.

4.4 SECOND EMBODIMENT OF A MAC PROTOCOL CONSISTENT WITH THE PRESENT INVENTION

This embodiment is similar to the first embodiment described above in §4.3. A station S first looks up the CoopTable to find the helper with the minimal transmission time for the packet to be sent, when it obtains the channel access. The transmission time $T'_{coop-data}$ assumes the same format as Equation 9. The associated signaling overhead is $T'_{coop-sig}$:

$$T'_{coop-sig} = T'_{direct-sig} \qquad \text{Equation 20}$$

More explanation on the computation of $T'_{coop-sig}$ is provided in the following description of protocol details. The total time for transmitting a data packet in a cooperative manner is:

$$T'_{coop} = T'_{coop-data} + T'_{coop-sig} \qquad \text{Equation 21}$$

Similarly, the helper should be used only if the condition defined in Equation 22 is met. Otherwise, the packet is delivered directly, following the rules specified in the IEEE 802.11 standard.

$$T_{legacy} > T'_{coop} \qquad \text{Equation 22}$$

Once the decision of resorting to assistance from the helper has been made and a certain helper has been selected, the S and D then perform an RTS/CTS handshake and configure the NAV value according to the legacy IEEE 802.11.

Figure 13:
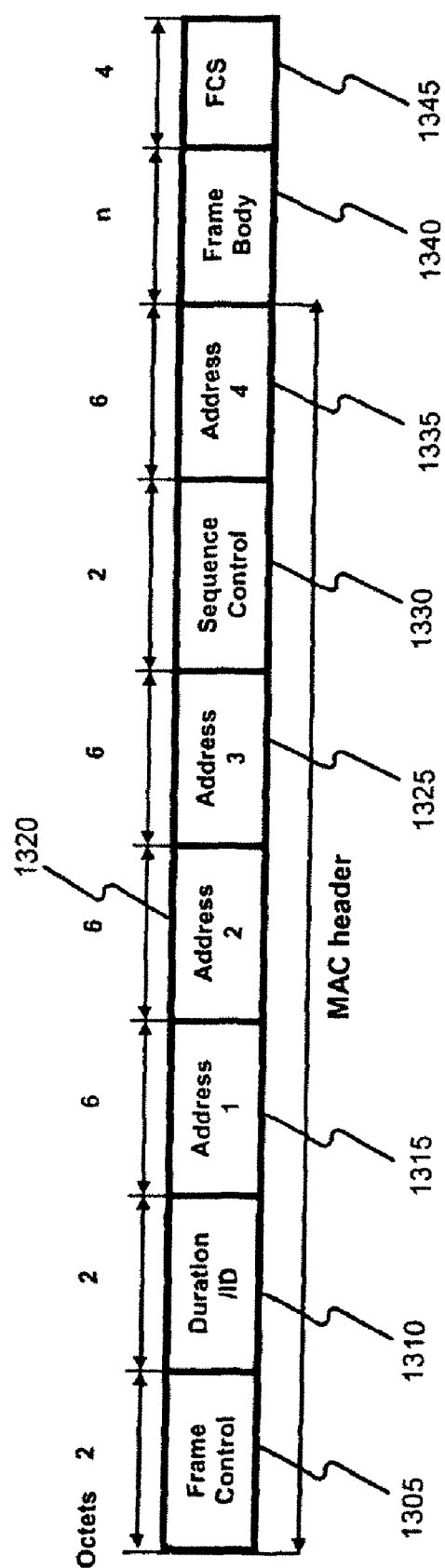
FIG. 13 is a modified MAC header, consistent with the present invention, for a data frame sent by a source station to a helper station when the source station decides to use a cooperative approach consistent with the present invention.

If the RTS/CTS handshake is successfully completed, the S transmits the data frame to the H at the rate $R_{sh}$, which is retrieved from the CoopTable. A minor modification to the MAC header of the data frame from S to H has been made, as shown in FIG. 13. In the legacy IEEE 802.11, the address 4 field 1335 is never used for data frame, except when the data frame is exchanged with another AP, where toDS and fromDS subfields within the frame control field 1305 are both set to 1. Therefore, it is feasible for cooperative MAC to use address 4 field 1335 to indicate the MAC address of the selected helper.

Once the helper correctly receives the data frame, and realizes that the frame requires relaying, it forwards the frame directly to the destination, without resorting to further assistance from other intermediate nodes.

4.4.1 Backward Compatibility of the Second Embodiment with IEEE 802.11

The second embodiment is identical to the legacy IEEE 802.11, regarding to the RTS/CTS handshake and the NAV configuration. Hence, all legacy IEEE 802.11 stations can set up their NAV value properly and will not pose any potential interference to the communication of cooperative stations. Moreover, the change introduced in the MAC protocol, namely the use of address 4 field 1335 in the MAC header of data frame and the forwarding mechanism, can be easily implemented in the software/firmware, without needing to modify the hardware for the current IEEE 802.11 product. Hence, backward compatibility is readily guaranteed.

Note, however, that several special scenarios may occur in the second embodiment, which are enumerated. Under the first special scenario, the actual transmission rate between S and the selected H is lower than $R_{sh}$, which makes H unable to decode the data frame correctly and then unable to forward the data to the real destination. All the stations that are not involved in the transmission resume proper channel access procedure only after the NAV timer has expired. S, D and H may detect the error earlier, and hence could have continued the channel access procedure before other stations. Nonetheless, these stations are also subject to the NAV constraints, due to fairness concerns. This scenario arises, when the channel condition deteriorates possibly due to the mobility of the S and/or H. Under the second scenario, the actual transmission rate between H and D is lower than $R_{hd}$, which may potential result in a two-hop transmission that requires more channel time than actually needed if the direct transmission is used. In this case, the helper H still relays the received data frame, as long as it is correctly received. The first embodiment advantageously avoids the issues that may arise under these special scenarios, and is therefore advantageous in this regard. However, the first embodiment defines a new message—HTS—and introduces three new fields into the RTS, which may potentially cause additional implementation complexity and compromise the backward compatibility.

4.5 EXEMPLARY METHODS

Figure 10:
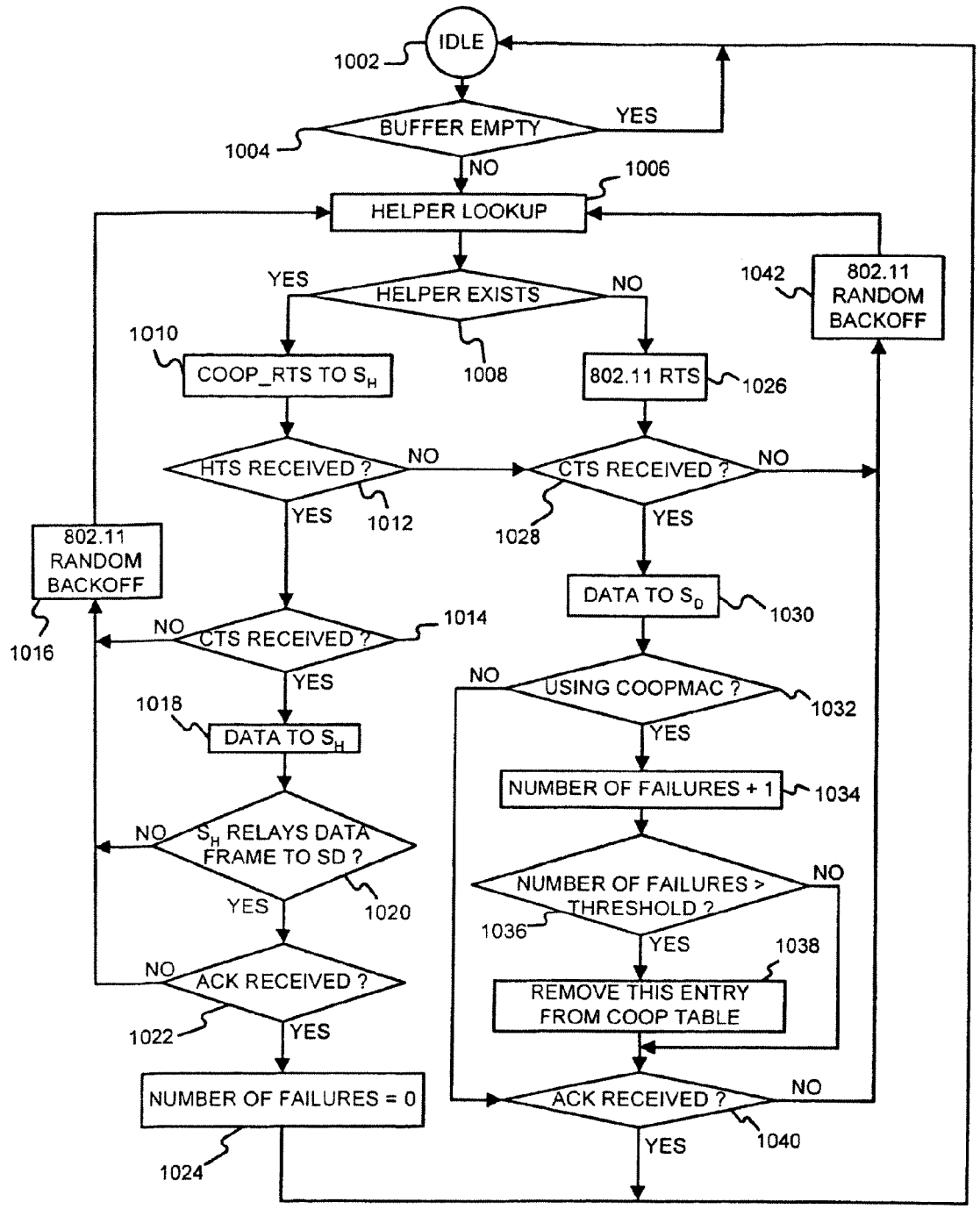
FIG. 10 is a flow diagram illustrating an exemplary method performed by a source station in a manner consistent with the present invention.

FIG. 10 is a flow diagram illustrating an exemplary source station method consistent with the present invention. In particular, whenever there is at least one packet buffered in the queue, $S_s$ (source station) should search for a helper candidate in the CoopTable. (Blocks 1004 and 1006) If a helper is successfully found, information such as helper ID, $R_{sh}$, $R_{hd}$ should be returned by table lookup operation. Then, $S_s$ may send a CoopRTS message with the helper ID in the Address 1 field (See FIG. 13.) to specify the helper being selected. (Blocks 1008 and 1010) Further, $R_{sh}$ and $R_{hd}$ should also be included in the corresponding fields of CoopRTS, indicating the expected data rates between $S_s$ and $S_h$, and between $S_h$ and $S_d$, respectively. Referring back to block 1008, if the table lookup yields a failure, the regular IEEE 802.11 MAC procedure for data transmission should be followed. (Block 1026) The duration field in the CoopRTS is defined by $$Duration_{coopRTS} = 3T_{SIFS} + T_{CTS} + \frac{8L}{R_{direct}} + T_{PLCP} + T_{ACK}.$$

If neither an HTS from $S_h$ nor a CTS from $S_d$ is heard after 2SIFS+CTS time, then $S_s$ should perform regular random backoff as if it encountered a collision. (Blocks 1012, 1028, and 1042) In another instance, if a CTS is lost after an HTS was sent by the helper, $S_s$ should again perform regular random backoff, as if it encountered a collision. (Blocks 1012, 1014, and 1016)

If $S_s$ does not receive any HTS message from $S_h$, but does hear a CTS from $S_d$, it may then send the data, using the legacy 802.11 RTS/CTS protocol. (Blocks 1012, 1028, and 1030) Subsequently, to update the CoopTable (provided $S_s$ is using the CoopMAC approach), $S_s$ should increment "Number of Failures" by one, if the HTS message is not received after a SIFS time. (Blocks 1032, 1034) If the value of "umber of Failures" is greater than a threshold (e.g., 3), then $S_s$ should remove the entry from CoopTable. (Blocks 1036 and 1038) If, on the other hand, if the value of "umber of Failures" is not greater than the threshold, then $S_s$ may check to see if an ACK packet has been received after an ACK timeout. (Blocks 1036 and 1040) Similarly, referring back to block 1032, if $S_s$ is not using a CoopMAC approach, it may then proceed again to check if an ACK packet has been received after an ACK timeout. (Block 1040) Next, if an acknowledgment (ACK) is not received after an ACK timeout, $S_s$ should perform random backoff, following the legacy 802.11 protocol. (Blocks 1040, 1042) Otherwise, $S_s$ consider the transmission as a success, and handle the next packet in its queue. (Block 1040 and Node 1002)

Referring back to block 1012, if both HTS and CTS messages are received, $S_s$ may send the data to $S_h$ at the rate of $R_{sh}$, and set the ACK timeout as follows:

$$ACKTimeout\_H = 2T_{SIFS} + \frac{8L}{R_{hd}} + T_{PLCP} + T_{ACK}.$$

(Blocks 1012, 1014, and 1018)

If $S_h$ (helper station) cannot or does not relay the data frame to $S_d$ (destination station), then $S_s$ may perform random backoff, following the legacy 802.11 protocol. (Blocks 1020 and 1016) Conversely, if $S_h$ successfully relays the data frame to $S_d$, then $S_s$ may proceed to check for the arrival of an ACk packet. (Blocks 1020 and 1022) If an acknowledgment (ACK) is not received after an ACK timeout, $S_s$ should perform random backoff, following the legacy 802.11 protocol. (Blocks 1022 and 1016) Otherwise, if the ACK is received timely, $S_s$ may also reset the "Number of Failures" to zero in the CoopTable for the corresponding entry and finally declare a success, and handle the next packet in its queue. (Blocks 1022 and 1024, and node 1002) Although not shown, if a failure occurs at block 1020 or 1022, failure updates and checks similar to that of blocks 1034, 1036 and 1038 can be performed.

Figure 11:
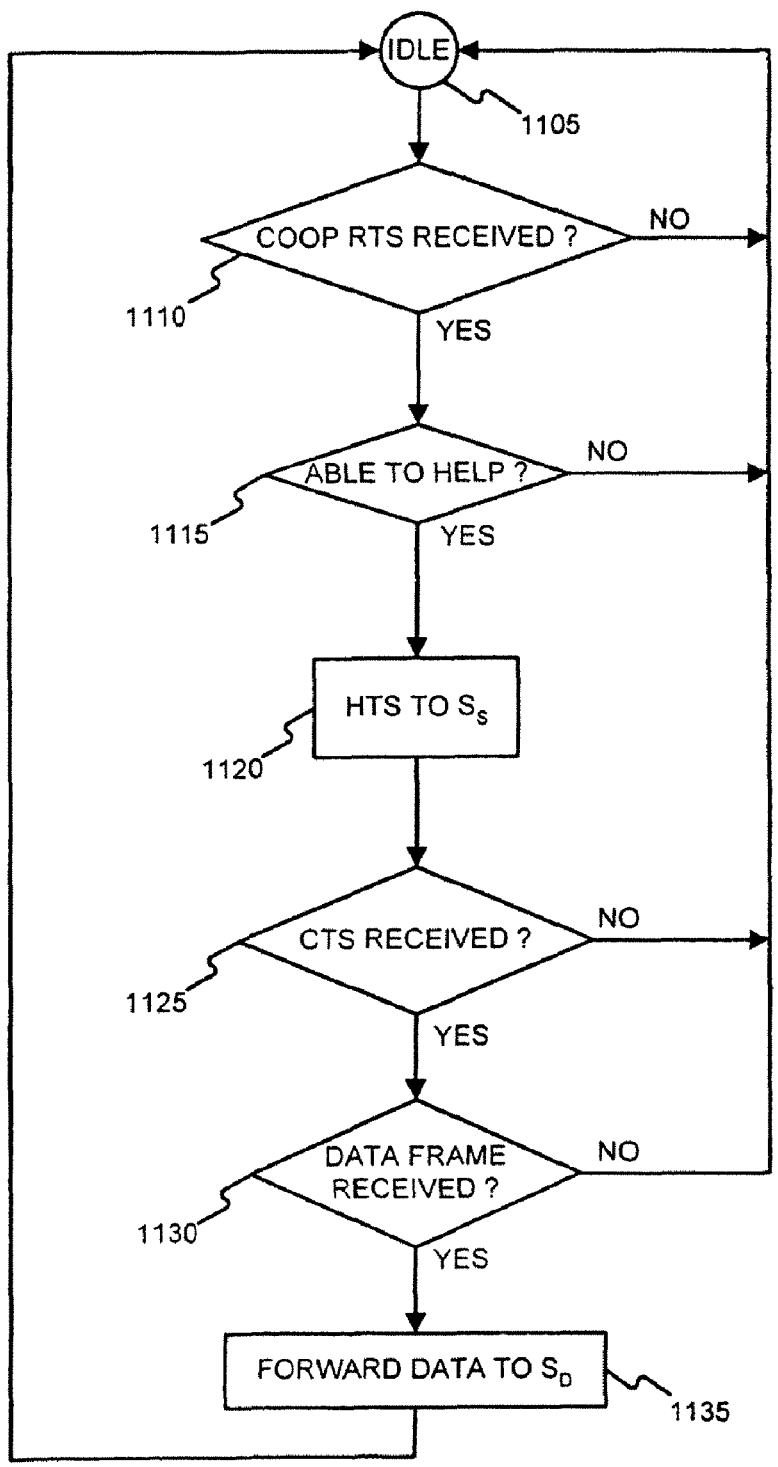
FIG. 11 is a flow diagram illustrating an exemplary method performed by a helper station in a manner consistent with the present invention.

FIG. 11 is a flow diagram illustrating an exemplary helper station method consistent with the present invention. Specifically, if $S_h$ receives a CoopRTS message, whose Address 1 field contains its MAC address (See FIG. 13.), $S_h$ should check whether it is able to help or not. (Blocks 1110 and 1115) In particular, it may verify whether the rate $R_{sh}$ between itself and $S_s$, and the rate $R_{hd}$ between itself and $S_d$ suggested in the CoopRTS message is sustainable. If $S_h$ is not able to help (e.g., not able to sustain the data rates necessary), it may then abort and go back to idle state. (Block 1115 and node 1105) If, on the other hand, $S_h$ is able to help, it may then send an HTS message back to $S_s$ after a SIFS time, with the duration field calculated by $$Duration_{HTS} = 4T_{SIFS} + T_{CTS} + \frac{8L}{R_{sh}} + \frac{8L}{R_{hd}} + 2T_{PLCP} + T_{ACK}.$$

(Blocks 1115 and 1120)

After sending the HTS to $S_s$, $S_h$ should run a timer of value SIFS+CTS, and expect a CTS from $S_d$. If $S_h$ does receive such a CTS, it then should wait for the data packet from $S_s$ to arrive SIFS time after the CTS message. (Blocks 1125 and 1130) If, on the other hand, $S_h$ does not receive either the CTS message or the data packet as expected, it should assume that the data transmission was aborted and revert to the initial state. (Blocks 1125, 1130, and 1105) When the data packet to be forwarded arrives, $S_h$ should forward the data packet to $S_d$ at the rate $R_{hd}$, SIFS time after the arrival of the data packet. (Blocks 1130 1135) If $S_h$ cannot support rates $R_{sh}$ and $R_{hd}$, $S_h$ simply goes back to the initial state (idle state). (Block 1105)

Figure 12:
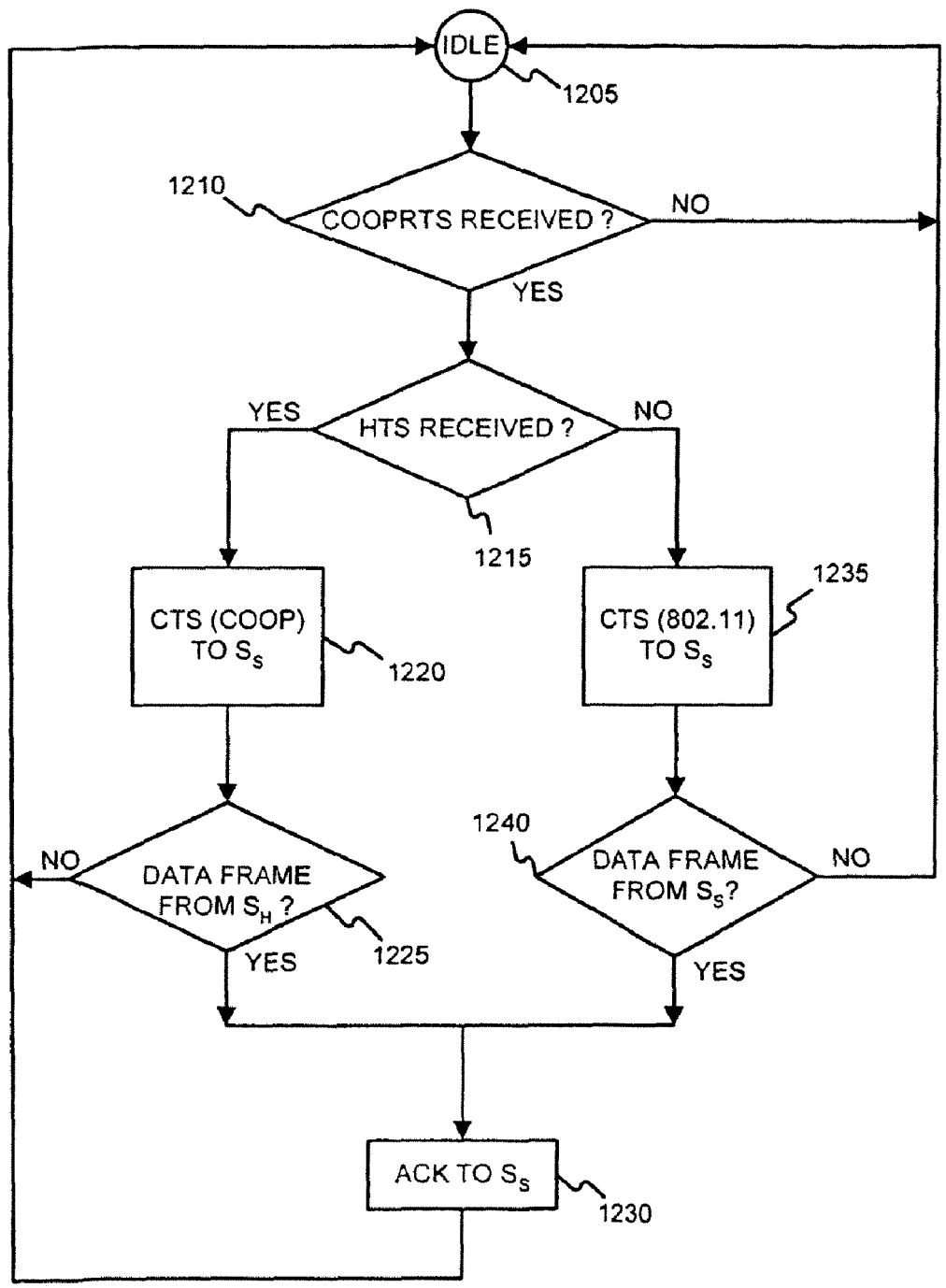
FIG. 12 is a flow diagram illustrating an exemplary method performed by a destination station in a manner consistent with the present invention.

FIG. 12 is a flow diagram illustrating an exemplary method of operations performed by the destination station during the cooperative MAC approach in a manner consistent with the present invention. If $S_d$ receives a CoopRTS, whose RA field is set to the MAC address of $S_d$, $S_d$ should wait for the corresponding HTS message from $S_h$. (Blocks 1210 and 1215) If $S_d$ hears an HTS message from $S_h$, it transmits a CTS (coop) message back to $S_s$ after a SIFS interval, with the duration field calculated using the equation below.

$$Duration_{CTS\_H} = 3T_{SIFS} + \frac{8L}{R_{sh}} + \frac{8L}{R_{hd}} + 2T_{PLCP} + T_{ACK}.$$

(Blocks 1215 and 1220) A data timer SIFS+$8L/R_{sh}$+$T_{PLCP}$+SIFS corresponding to the expected time of the arrival of data packet is initiated. If the data frame does not arrive before this timer expires, it assumes that the data transmission was aborted and goes back to the initial state. (Blocks 1225 and node 1205) Otherwise, $S_d$ has successfully received the data frame from $S_h$ and may send an ACK packet back to $S_s$. (Blocks 1225 and 1230)

Referring back to block 1215, if the HTS message is not received by $S_d$ after a SIFS interval, $S_d$ follows the standard 802.11 approach and transmits the CTS message, with the duration field defined by $$Duration_{CTS\_NH} = 2T_{SIFS} + \frac{8L}{R_{direct}} + T_{PLCP} + T_{ACK}.$$

(Blocks 1215 and 1235) If the data frame does not arrive before this timer expires, it assumes that the data transmission was aborted and goes back to the initial state. (Block 1240 and node 1205) Otherwise, $S_d$ has successfully received the data frame from $S_s$ and may send an ACK packet back to $S_s$. (Blocks 1240 and 1230)

4.6 EXEMPLARY OF OPERATIONS

Figure 15:
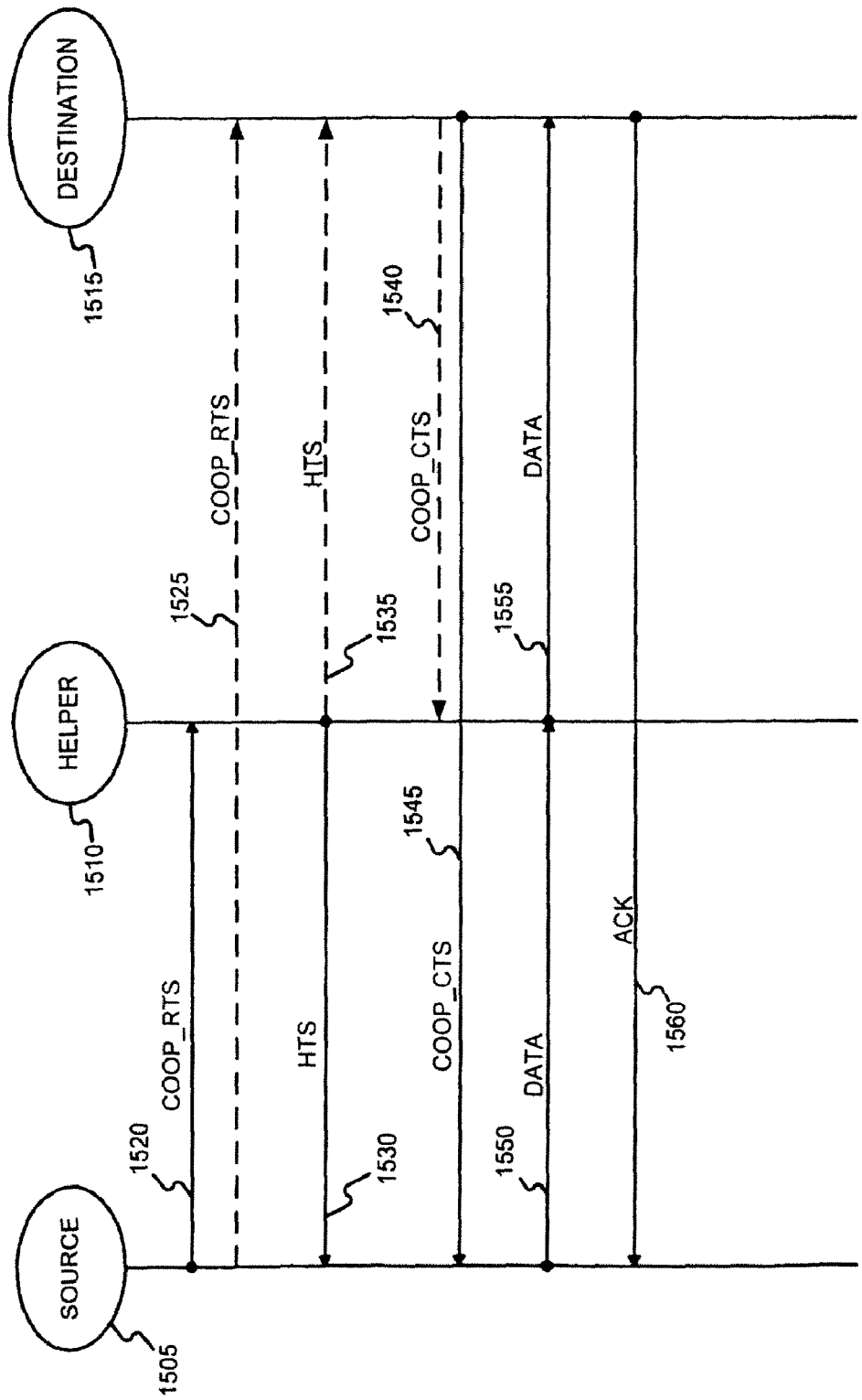
FIG. 15 is a messaging diagram illustrating the communication of control messages, data, and acknowledgment messages between a source station, a helper station, and a destination station in a manner consistent with the present invention.

FIG. 15 is a messaging diagram illustrating the communication of control packets, data packets, and acknowledgment packets between a source station 1505, a helper station 1510, and a destination station 1515 in a manner consistent with the present invention. This example assumes that the source station 1505 has determined that it would be beneficial to send data to the destination station 1515 via the helper station 1510.

The source station may initially broadcast a Coop_RTS message (e.g., packet) 1520 to the helper station 1510, indicating that it is ready to send data and desires the help of the helper station 1510. Meanwhile the destination station 1515 may overhear the transmitted Coop_RTS message as indicated by the dashed line 1525.

In return, the helper station 1510, may broadcast an HTS message (e.g., packet) 1530, back to the source station 1505, thereby indicating that it is ready to help relay data. Again, the destination station 1515 may overhear the transmitted HTS message as indicate by the dashed line 1535. As a result, the destination station 1515 may broadcast a Coop_CTS message 1545 back to the source station 1505. This time, it is the helper station 1510 that may overhear the transmitted Coop_CTS message, as indicated by the dashed line 1540.

Since the source station 1505 has received the Coop_CTS message 1545, it may now transmit its data to the helper station 1510, indicated by 1550. In turn, the helper station 1510 may relay the data by transmitting it to the destination station 1515 as indicated by 1555. Once the destination station 1515 receives the data, it may then send an ACK packet directly back to the source station 1505 as indicated by 1560. Thus the communication and exchange of data between a source station and a destination station through the aid of a helper station has been completed.

4.7 EXEMPLARY APPARATUS CONSISTENT WITH THE PRESENT INVENTION

Embodiments consistent with the present invention may be implemented in hardware and/or software (e.g., integrated circuits, ASICs, processor(s) executing stored program instructions, etc.). It may be advantageous to implement such embodiments just as the IEEE 802.11 protocol stack is implemented. In such a case, embodiments consistent with the present invention may only need to make minor modifications to the existing IEEE 802.11 protocol stack software implementation.

Figure 14:
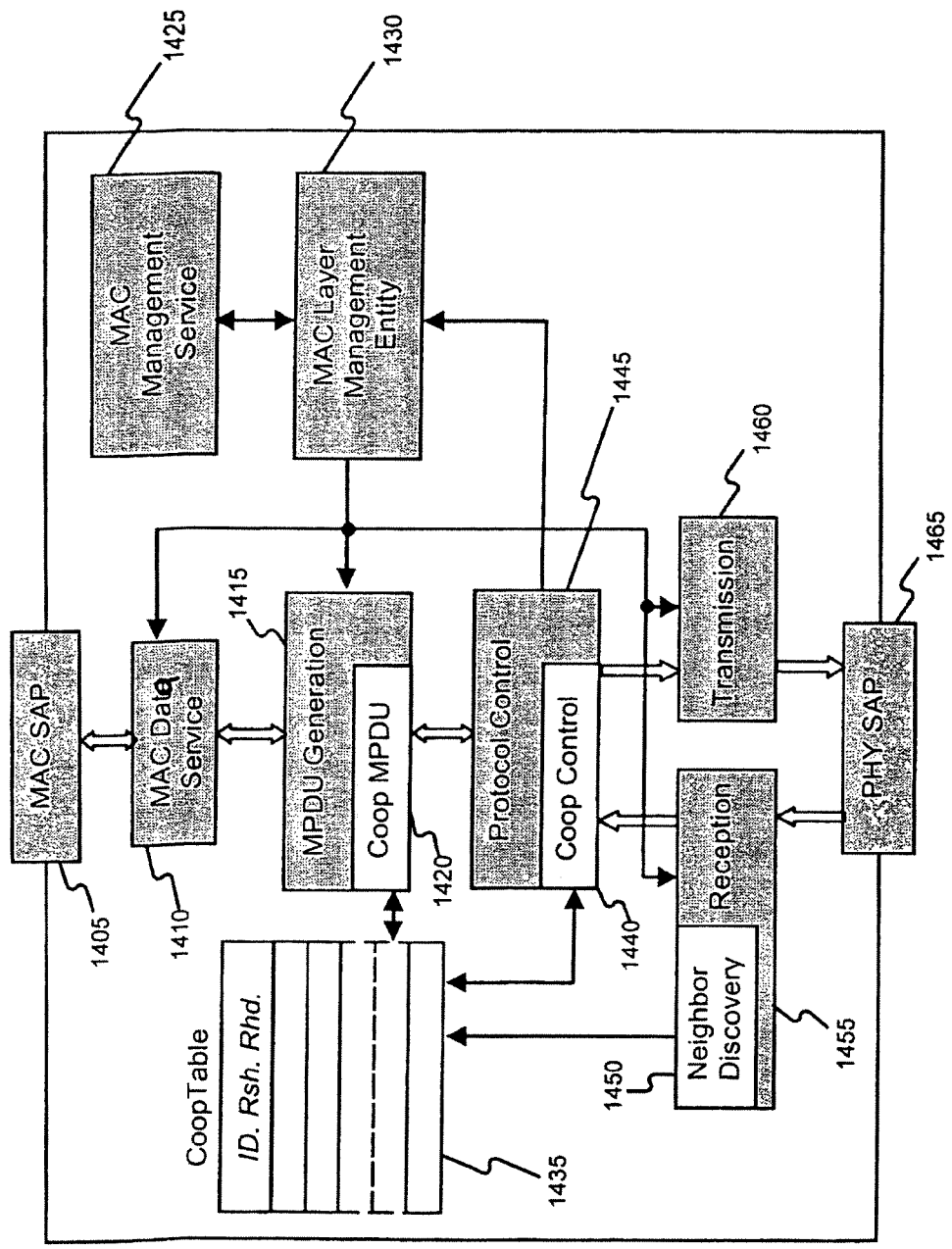
FIG. 14 is a block diagram illustrating an exemplary apparatus for implementing a cooperative MAC scheme in a manner consistent with the present invention.

According to the formal description of MAC operation of ANSI/IEEE Standard 802.11b, the MAC provides the MAC-SAP (service access point) interface to the LLC layer to convey MSDU and uses PHY-SAP to interact with the PHY layer. FIG. 14 is a block diagram of an exemplary implementation of an embodiment consistent with the present invention.

An exemplary embodiment consistent with the present invention may perform a distributed coordination function, a point coordination function, a backoff procedure, a physical and virtual carrier sense, RTS/CTS/HR/ACK message exchange, neighboring node discover and helper table management, helper node choose, packet relay from source to destination, synchronization, power management, and association and reassociation.

The exemplary embodiment of FIG. 14 may include six (6) main modules, each represented by a single block. The modules may include (i) a MAC Data Service Module (e.g., same as Standard 802.11) 1410, (ii) an MPDU Generation Module 1415, (iii) a Protocol Control Module 1440, (iv) a Transmission Module (e.g., same as Standard 802.11) 1460, (v) a Reception Module 1455, and (vi) a MAC Layer Management Module (e.g., same as Standard 802.11) 1430. All the parameters of the primitives are stored in the corresponding block and can be exchanged between all the modules.

The functions that may be performed by each module are described below. The MAC Data Service Module 1410 may receive MSDU from LLC FSM (Finite State Machine), (b) add a basic MAC header and send to the MPDU generation 1415. It 1410 may also extract appropriate address and status information from the received MAC MSDU, and generate an indication to LLC.

The MPDU Generation Module 1415 may find the optimum helper node by checking the helper table, generates the MPDU, add the MAC address of the helper if two hop transmission is faster, and prepares the FSM and fragmenting.

The Protocol Control Module 1445 may generate RTS/CTS/HR frames, send MPDU to Tx Module or generate an indication to the MPDU generation module for the received data, generate the ACK frame, manage the Helper table (e.g., delete, update, etc.), route packet from the source node to the destination node, and manage frame to MLME 1430.

The Transmission Module 1460 may handle backoff FSM and calculate the random backoff, and data pump FSM send MPDU to the PHY.

The Reception Module 1455 may receive an MPDU from the PHY 1465. Channel State FSM may maintain channel state based on physical and virtual carrier sensing. Neighboring node discovery 1455 may add and update neighbor nodes. The reception module 1455 may also filter the received frame, detect duplicated frames, and assemble the fragmented frames.

The MAC Layer Management Module 1430 may associate, reassociate and disassociate, perform synchronization of time, beacon, etc., perform power management, perform authentication, and distribute MPDUs 1415 FSM.

The exemplary embodiment only modifies the MAC layer of the traditional 802.11, and can therefore be based on any one of the IEEE 802.11 physical layers. The implementation can be based on the 802.11 chipsets available on the market by re-programming the MAC controllers. It can also be implemented in hardware, such as FPGAs or ASICs. Other implementation includes, but not limited to, using a wireless LAN network interface card (NIC) that includes only transmit/receive functionality and a NIC device driver in which allows us to implement the MAC layer protocol by software. Thus, various aspects of the present invention may be implemented as stored program instructions executed by one or more processors, and/or in hardware.

4.8 ALTERNATIVES AND REFINEMENTS

Although CoopTable information may be maintained at each station (e.g., at a sender station), in at least some embodiments consistent with the present invention, such information may be alternatively or additionally stored at a central location (e.g., the AP) or at a proxy.

Although comparisons of direct communications versus two hop communications were described as being performed at the sender station, in at least some embodiments consistent with the present invention, this comparison may be performed (or the values used in this comparison may be generated) at another station, or at a proxy, or at a central location. Further, although a single hop transmission was compared with a direct transmission, multiple hop transmissions can be considered as well.

Although some of the exemplary embodiments described above provided sender, helper and destination functionality in each station or one station, embodiments consistent with the present invention may include one or two of these functions at a single station, rather than all three. For example, inexpensive, dumb (e.g., without any or full sender and destination functionality) helper stations can be deployed in a wireless LAN.

4.9 CONCLUSIONS

As can be appreciated from the foregoing examples, embodiments consistent with the present invention can improve network performance, in terms of the achievable throughput and average delay experienced by the data packets transmitted by each station. Such embodiments can also improve the system fairness in the sense that it reduces the channel time occupied by low rate stations. Such embodiments can also extend the range of the wireless network. Finally, at least some embodiments providing a new MAC protocol in a manner consistent with the present invention entail only minor software modifications to legacy MAC implementations, and maintain backward compatibility with the legacy IEEE 802.11 systems.

What is claimed is:

1. A method for transmitting data over a wireless local area network (LAN), the method comprising:
   estimating, based at least on a transmission between a source wireless device and an intermediate wireless device, a first data rate for communicating between the source wireless device and the intermediate wireless device; estimating, based at least on a transmission between the intermediate wireless device and a destination wireless device, a second data rate for communicating between the intermediate wireless device and the destination wireless device;
   receiving, by the intermediate wireless device, data sent from the source wireless device to the destination wireless device, the data including information identifying a third data rate for communicating between the source wireless device and the destination wireless device;
   determining, by the intermediate wireless device, based on the first data rate, the second data rate, and the third data rate, whether to send the data from the intermediate wireless device to the destination wireless device;
   and
   sending the data from the intermediate wireless device to the destination wireless device in response to determining to send the data from the intermediate wireless device to the destination wireless device.

2. The method of claim 1, wherein estimating the first data rate comprises:
   subtracting a fixed transmission power value from the detected power strength of the transmission between the source wireless device and the intermediate wireless device.

3. The method of claim 1, further comprising:
   storing, in the intermediate wireless device, the first data rate and the second data rate; and
   storing, in the intermediate wireless device, a time that the packet was received.

4. The method of claim 3, further comprising:
associating the time with information that identifies a media access card address of the source wireless device.

5. The method of claim 3, further comprising:
storing, in the intermediate wireless device, a number of failed attempts of the intermediate wireless device to send the data to the destination wireless device.

6. The method of claim 5, further comprising:
deleting the stored first data rate and the stored number of failed attempts in response to determining that the stored number of failed attempts exceeds a value.

7. The method of claim 5, further comprising:
deleting the stored first data rate and the stored number of failed attempts in response to determining that a predefined amount of time has elapsed since the stored time.

8. The method of claim 1, further comprising:
determining, by the intermediate wireless device, a first time needed to transmit the data from the source wireless device to the destination wireless device via the intermediate wireless device, the first time determined from at least the first data rate and the second data rate; and
determining, by the intermediate wireless device, a second time needed to transmit the data directly from the source wireless device to the destination wireless device;
wherein determining whether to send the data from the intermediate wireless device to the destination wireless device comprises determining whether the first time is less than the second time.

9. A non-transitory computer-readable storage medium having instructions stored thereon for transmitting data over a wireless local area network (LAN), the instructions comprising:
instructions to estimate, based at least on a transmission between a source wireless device and an intermediate wireless device, a first data rate for communicating between the source wireless device and the intermediate wireless device;
instructions to estimate, based at least on a transmission between the intermediate wireless device and a destination wireless device, a second data rate for communicating between the intermediate wireless device and the destination wireless device;
instructions to receive data sent from the source wireless device to the destination wireless device, the data including information identifying a third data rate for communicating between the source wireless device and the destination wireless device;
instructions to determine, by the intermediate wireless device, based on the first data rate, the second data rate, and the third data rate, whether to send the data from the intermediate wireless device to the destination wireless device; and
instructions to send the data from the intermediate wireless device to the destination wireless device in response to determining to send the data from the intermediate wireless device to the destination wireless device.

10. The computer-readable storage medium of claim 9, wherein the instructions to estimate the first data rate comprise:
instructions to subtract a fixed transmission power value from the detected power strength of the transmission between the source wireless device and the intermediate wireless device.

11. The computer-readable storage medium of claim 9, the instructions further comprising:
instructions to store, in the intermediate wireless device, the first data rate and the second data rate; and
instructions to store, in the intermediate wireless device, a time that the packet was received.

12. The computer-readable storage medium of claim 11, the instructions further comprising:
instructions to associate the time with information that identifies a media access card address of the source wireless device.

13. The computer-readable storage medium of claim 11, the instructions further comprising:
instructions to store, in the intermediate wireless device, a number of failed attempts of the intermediate wireless device to send the data to the destination wireless device.

14. The computer-readable storage medium of claim 13, the instructions further comprising:
instructions to delete the stored first data rate and the stored number of failed attempts in response to determining that the stored number of failed attempts exceeds a threshold.

15. The computer-readable storage medium of claim 13, the instructions further comprising:
instructions to delete the stored first data rate and the stored number of failed attempts in response to determining that an amount of time has elapsed since the stored time.

16. The computer-readable storage medium of claim 9, the instructions further comprising:
instructions to determine a first time needed to transmit the data from the source wireless device to the destination wireless device via the intermediate wireless device, the first time determined from at least the first data rate and the second data rate; and
instructions to determine a second time needed to transmit the data directly from the source wireless device to the destination wireless device;
wherein the instructions to determine whether to send the data from the intermediate wireless device to the destination wireless device comprise instructions to determine that the first time is less than the second time.

17. An intermediate wireless local area network (LAN) device, comprising:
a processor coupled to a computer-readable medium, the computer-readable medium having instructions stored thereon, the instructions comprising:
instructions to estimate, based at least on a transmission between a source wireless device and the intermediate wireless device, a first data rate for communicating with the source wireless device;
instructions to estimate, based at least on a transmission between the intermediate wireless device and a destination wireless device, a second data rate for communicating with the destination wireless device;
instructions to receive data sent from the source wireless device to the destination wireless device, the data including information identifying a third data rate for communicating between the source wireless device and the destination wireless device;
instructions to determine, based on the first data rate, the second data rate, and the third data rate, whether to send the data from the intermediate wireless device to the destination wireless device; and
instructions to send the data to the destination wireless device in response to determining to send the data to the destination wireless device.

18. The wireless device of claim 17, wherein the instructions to estimate the first data rate comprise:

instructions to subtract a fixed transmission power value from the detected power strength of the transmission between the source wireless device and the intermediate wireless device.

19. The wireless device of claim 17, wherein the instructions further comprise:

instructions to store the first data rate and the second data rate; and instructions to store a time that the packet was received.

20. The wireless device of claim 19, wherein the instructions further comprise:

instructions to associate the time with information that identifies a media access card address of the source wireless device.

21. The wireless device of claim 19, wherein the instructions further comprise:

instructions to store a number of failed attempts of the intermediate wireless device to send the data to the destination wireless device.

22. A wireless system, comprising:

a source wireless device;

a destination wireless device; and an intermediate wireless device, wherein the intermediate wireless device is configured to:

estimate, based at least on a transmission between the source wireless device and the intermediate wireless device, a first data rate for communicating with the source wireless device;

estimate, based at least on a transmission between the intermediate wireless device and the destination wireless device, a second data rate for communicating with the destination wireless device;

receive data sent from the source wireless device to the destination wireless device, the data including information identifying a third data rate for communicating between the source wireless device and the destination wireless device;

determine, based on the first data rate, the second data rate, and the third data rate, whether to send the data from the intermediate wireless device to the destination wireless device; and send the data to the destination wireless device in response to determining to send the data to the destination wireless device.

23. The wireless system of claim 22, wherein the intermediate wireless device is configured to estimate the first data rate based on at least a detected power strength of the transmission between the source wireless device and the intermediate wireless device.

* * * * *

UNITED STATES PATENT AND TRADEMARK OFFICE
CERTIFICATE OF CORRECTION

| | | |
|---|---|---|
| PATENT NO. | : 8,175,003 B2 | Page 1 of 1 |
| APPLICATION NO. | : 11/937823 | |
| DATED | : May 8, 2012 | |
| INVENTOR(S) | : Panwar et al. | |

It is certified that error appears in the above-identified patent and that said Letters Patent is hereby corrected as shown below:

On the Face Page, in Field (75), under "Inventors", in Column 1, Line 2, delete "NJ" and insert -- NY --, therefor.

In Column 8, Line 19, delete "may" and insert -- many --, therefor.

In Column 12, Line 28, delete ""umber" and insert -- "Number --, therefor.

In Column 12, Line 31, delete ""umber" and insert -- "Number --, therefor.

Signed and Sealed this
First Day of January, 2013

David J. Kappos
*Director of the United States Patent and Trademark Office*